(12) United States Patent
Hibbs et al.

(10) Patent No.: US 7,137,607 B2
(45) Date of Patent: Nov. 21, 2006

(54) APPARATUS FOR SECURING A CAP OF A CONTAINER TO AN EXTERNAL STRUCTURE

(76) Inventors: Richard D. Hibbs, 8613 112th Ave. NE., Lake Stevens, WA (US) 98258; Denise E. Rivette, 2631 324th St. NW., Stanwood, WA (US) 98292

(*) Notice: Subject to any disclaimer, the term of this patent is extended or adjusted under 35 U.S.C. 154(b) by 0 days.

(21) Appl. No.: 10/687,453

(22) Filed: Oct. 15, 2003

(65) Prior Publication Data

US 2005/0082448 A1 Apr. 21, 2005

(51) Int. Cl.
*A47H 1/16* (2006.01)
*B60K 15/05* (2006.01)

(52) U.S. Cl. .............. 248/302; 248/112; 248/303; 248/682

(58) Field of Classification Search ........... 248/340, 248/682, 690, 302, 303, 315, 112
See application file for complete search history.

(56) References Cited

U.S. PATENT DOCUMENTS

| | | | | | |
|---|---|---|---|---|---|
| 365,802 | A | * | 7/1887 | Dow | 248/690 |
| 1,390,389 | A | * | 9/1921 | Rosenfeld | 248/231.81 |
| 1,794,911 | A | * | 3/1931 | Livermore | 267/73 |
| 2,066,886 | A | * | 1/1937 | Henn | 248/690 |
| 2,995,333 | A | * | 8/1961 | Pazzano | 248/230.7 |
| 3,132,860 | A | * | 5/1964 | Nantz | 472/105 |
| 3,260,149 | A | * | 7/1966 | Deaver | 411/337 |
| 3,452,952 | A | * | 7/1969 | Saraydar | 248/75 |
| 3,706,154 | A | * | 12/1972 | Luebbers et al. | 43/53.5 |
| 3,981,471 | A | * | 9/1976 | Currier | 248/317 |
| D258,330 | S | * | 2/1981 | Bosley | D6/556 |
| 4,746,089 | A | * | 5/1988 | Clapper | 248/309.4 |
| 4,997,156 | A | * | 3/1991 | Allen | 248/311.2 |
| 4,997,222 | A | * | 3/1991 | Reed | 294/3.6 |
| 5,060,995 | A | * | 10/1991 | Goldstein et al. | 294/19.1 |
| 5,118,019 | A | * | 6/1992 | Harrison | 224/563 |
| 5,150,808 | A | * | 9/1992 | Hamilton | 220/375 |
| 5,364,053 | A | * | 11/1994 | Rodgers | 248/302 |
| 5,492,297 | A | * | 2/1996 | Underwood | 248/340 |
| D367,998 | S | * | 3/1996 | Graw et al. | D7/620 |
| 5,580,019 | A | * | 12/1996 | Glesser | 248/309.1 |
| 6,364,266 | B1 | * | 4/2002 | Garvin | 248/303 |

FOREIGN PATENT DOCUMENTS

JP 2002012044 A * 1/2002

\* cited by examiner

*Primary Examiner*—Anita M. King
(74) *Attorney, Agent, or Firm*—Christensen O'Connor Johnson Kindness PLLC

(57) ABSTRACT

Apparatus for securing a cap of a container to an external structure includes retaining structure configured to fit inside and engage the cap when the apparatus is installed. Securing structure connected to the retaining structure is used to releasably secure the cap to the external structure. In one embodiment, the retaining structure is a coil sized to exert a spring tension against the interior of the cap. In another embodiment, the retaining structure is an eyelet sized to receive a fastener secured within the cap. The securing structure may be comprised of a hook. Alternatively, the securing structure may be comprised of a clip or other closure mechanism. The apparatus may further include an intermediate bend providing a space that accommodates a feature of the cap, such as a vent in a fuel tank cap. The apparatus may remain in the cap when the cap is replaced on the container.

16 Claims, 2 Drawing Sheets

APPARATUS FOR SECURING A CAP OF A CONTAINER TO AN EXTERNAL STRUCTURE

FIELD OF THE INVENTION

The present invention is related to accessories for containers, and in particular, accessories for handling the cap of a container.

BACKGROUND OF THE INVENTION

Containers are constructed to hold a variety of liquid and solid materials. Containers typically include one or more caps that, when removed from the container, are not attached to the container but are set aside, particularly when material is being added to or taken from the container. When the cap is set aside, it can become damaged, contaminated, lost, or forgotten. This problem is especially apparent with motor driven vehicles (e.g., motorcycles, automobiles, etc.) that have a fuel tank with a cap.

When a fuel tank cap, or gas cap, is temporarily removed, the operator of the motor vehicle typically does not have an adequate place to store the cap. Some vehicle owners place the cap on the vehicle, such as on the seat of the motorcycle or on the trunk of the car, where the cap can fall off and be damaged. Placing a gas cap on the vehicle may also damage the vehicle itself, including the paint on the vehicle. Other vehicle owners put the gas cap in their pocket, but that is not desirable given the gasoline residue on the cap. Some vehicle owners put the gas cap on top of the fuel pump, but again, the gas cap may fall off and be damaged or become contaminated. The gas cap may also be forgotten and lost should the vehicle owner leave the filling station without replacing the gas cap. What is needed is an apparatus that secures a cap of a container, such as a fuel tank cap, to an external structure in a way that does not damage the external structure, but also minimizes circumstances where the cap can become damaged, contaminated, or lost. The present invention addresses this need and other shortcomings that are present in current container systems.

SUMMARY OF THE INVENTION

The present invention provides apparatus for securing a cap of a container to an external structure when the cap is removed from the container. In one particular embodiment, the apparatus is a hanger that secures a cap of a fuel tank to an external structure, such as a brake cable or throttle cable of a motorcycle or other portion of a motor vehicle. The apparatus of the present invention includes retaining structure that is configured to fit inside and engage the cap when the apparatus is installed in the cap. Securing structure connected to the retaining structure releasably secures the cap to the external structure when the apparatus is installed in the cap and the cap is removed from the container.

The retaining structure of the apparatus may use friction to releasably engage the interior of the cap when the apparatus is installed. For example, the retaining structure may be comprised of a coil that is sized to fit within the cap so that the coil exerts a spring tension against the interior of the cap.

In another embodiment, the retaining structure is an eyelet that is sized to receive a fastener secured within the interior of the cap and thereby engage the apparatus within the cap when the apparatus is installed. Furthermore, an eyelet and coil may be combined to provide retaining structure for the apparatus of the invention. The fastener that secures the eyelet to the cap may be comprised of any type of fastener, including a screw.

The securing structure of the apparatus, in one embodiment, is comprised of a hook that is configured to hang the apparatus from an external structure. The securing structure may also be a clip that is configured to releasably attach the apparatus to an external structure. Alternatively, the retaining structure may loop around the external structure and connect to the apparatus to releasably secure the apparatus to the external structure.

In one particular embodiment of the invention, the apparatus is a hanger configured for use with the cap of a fuel tank. The hanger is comprised of a body portion connected at one end to a coil and at the other end to a hook. The coil is sized to fit within the fuel tank cap so that the coil is retained within the cap by spring tension against the cap. The hook is configured to engage an external structure for hanging the cap from the external structure when the coil is installed in the cap and the cap is removed from the fuel tank. The coil, body, and hook of the hanger may be constructed of wire, and more specifically, a single integral length of wire. The wire may be made of stainless steel. The coil may be comprised of a partial loop or one or more loops.

The body of the hanger may be further configured with an intermediate bend providing a space that accommodates a feature of the fuel tank cap, such as a vent in the cap. Ideally, the hanger is configured to remain in the cap when the cap is attached to a fuel tank.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF PREFERRED EMBODIMENTS

Figure 1:
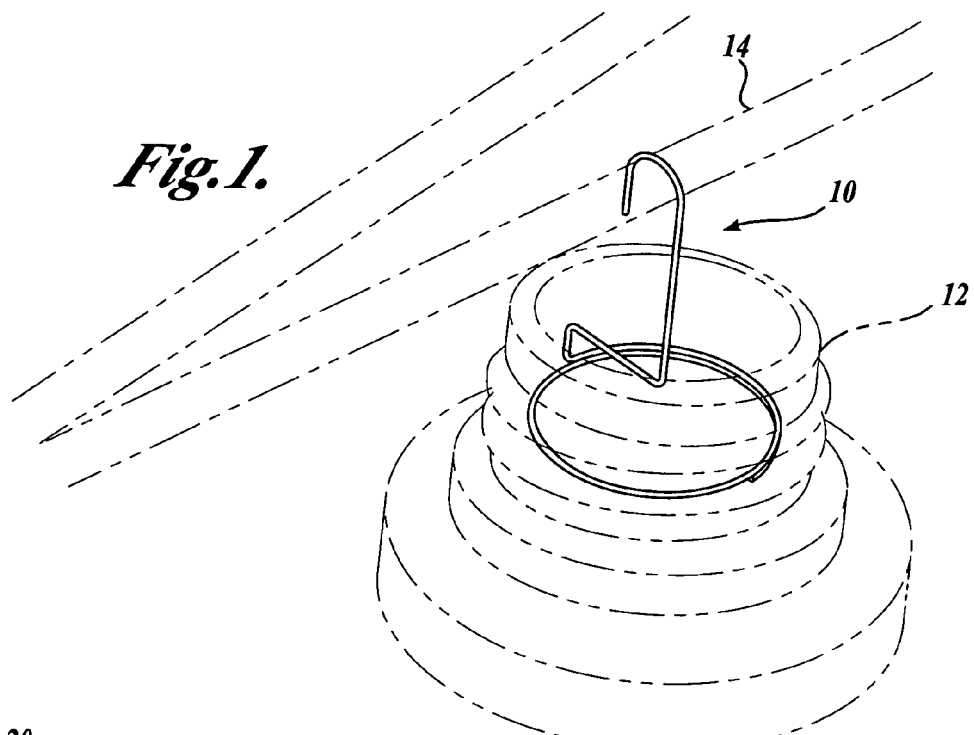
FIG. 1 is a pictorial diagram of one exemplary environment in which apparatus constructed according to the present invention may be used.

FIG. 1 illustrates one exemplary environment in which apparatus constructed according to the present invention may be used. In particular, FIG. 1 illustrates a hanger apparatus 10 that has been installed in a fuel tank cap, or a gas cap 12. The gas cap 12 has been removed from the fuel tank of a motor vehicle (not shown). The hanger 10 is configured to hang from an external structure, shown in FIG. 1 as a wire or a cable 14. A hook portion of the hanger 10 hooks over the cable 14 and thus suspends the gas cap 12 from the cable 14. In a motorcycle environment, for example, the cable 14 may be a brake cable or other wire or cable on the motorcycle, such as a throttle cable. Preferably, the cable 14 is positioned such that when the gas cap 12 is hanging from the cable 14, the gas cap 12 remains in sight of the motor vehicle operator, thus reminding the motor vehicle operator to unhook the gas cap and replace it on the fuel tank when the fuel tank is filled. In a preferred embodiment, the hanger 10 remains installed in the gas cap 12 when the gas cap is replaced on the fuel tank.

Figure 2:
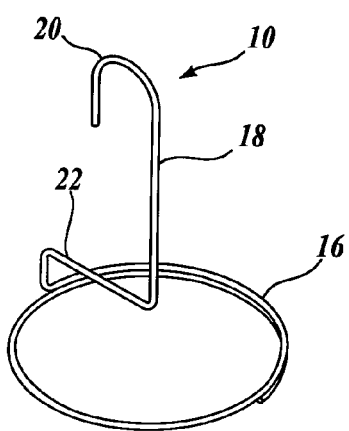
FIG. 2 is a perspective view of one embodiment of apparatus constructed in accordance with the present invention.

FIG. 2 provides a perspective view of a hanger apparatus constructed in accordance with the present invention for installation in a container cap, e.g., as shown in FIG. 1. In FIG. 2, the hanger 10 includes a coil 16, a body 18, and a hook 20. In this particular embodiment, the coil 16 is sized to fit within a cap of a container, such as a gas cap. The coil is configured to be retained within the cap by spring tension of the coil against the interior walls of the cap. Thus, for installation in a cap 12 as shown in FIG. 1, the circumference of the coil 16 is sized to be slightly larger than the circumference of the inner sidewalls of the cap 12 so that when the coil 16 is slightly compressed and installed within the cap 12, the coil 16 exerts an outward spring force against the cap.

The body 18 of the hanger 10 is connected to the coil 16 and is configured to extend away from the coil 16 and the cap 12 when the coil is installed in the cap. For the embodiment shown in FIG. 2, the body 18 extends somewhat perpendicular to the plane of the coil 16, though in other embodiments the body 18 may be angled to some degree from the coil 16, if desired.

Connected to the body 18 is a hook 20 that is configured to engage an external structure, such as a cable 14 as shown in FIG. 1, for hanging the cap 12 when the cap is removed from a container. The shape and size of the hook 20 may be configured as desired in anticipation of the type of external structure from which the hanger 10 and cap 12 are expected to hang.

The hanger 10 may be constructed of wire. In particular, the wire used to construct the coil 16, body 18, and hook 20 of the hanger 10 may be a single integral length of wire that is bent and shaped as need to provide a hanger apparatus according to the invention. In one preferred embodiment, the wire is made of stainless steel. One advantage of the apparatus provided by the present invention is its simplicity of design and installation.

The coil 16 may be comprised of a partial loop or one or more loops. The coil 16 preferably has a radius that is slightly larger than the radius of the cap in which the hanger 10 is to be installed so that the coil 16 exerts spring tension against the interior of the cap. The particular embodiment shown in FIG. 2 includes a coil 16 comprised of 1 ½ loops. Preferably, the loops forming the coil 16 are designed such that, in the unlikely event the hanger 10 should detach from the cap 12 when the cap 12 and hanger 10 are attached to a fuel tank, the hanger 10 will not fall further into the gas tank, but instead remain in a position where it can be easily retrieved.

The hanger 10 as shown in FIG. 2 further includes an intermediate bend 22 that provides a space between the body 18 and the coil 16 to accommodate a feature of the cap. For instance, in a fuel tank environment, the cap may have a vent with vent tubing that accommodates pressure differences in the tank. The intermediate bend 22 is preferably sized to provide sufficient space between the body 18 and the coil 16 to accommodate the vent in the cap.

As noted earlier, the hanger 10 is preferably configured to remain in the cap 12 when the cap 12 is attached to a container, such as a fuel tank. By remaining in the cap, the hanger 10 is readily available for hanging the cap 12 from an external structure 14 the next time the cap is removed from the tank.

More broadly speaking, the hanger 10 constitutes apparatus for securing a cap of a container to an external structure when the cap is removed from the container. The apparatus includes retaining structure, such as the coil 16, that is configured to fit inside and engage the interior of the cap when the apparatus is installed in the cap. The apparatus further includes securing structure, such as the body 18 and hook 20 shown in FIG. 2, connected to the retaining structure for releasably securing the cap to external structure when the apparatus is installed in the cap and the cap is removed from a container.

The retaining structure of the apparatus may use friction to releasably engage the interior of the cap when the apparatus is installed in the cap. For the embodiment shown in FIG. 2, as discussed earlier, the coil 16 is sized to exert spring tension against the interior of the cap, and thus use friction against the cap interior to releasably engage the cap when the hanger 10 is installed.

Other embodiments of the invention may use retaining structure that is different from or in addition to a coil 16 as shown in FIG. 2. For example, FIGS. 6 and 7 each depict retaining structure including an eyelet, which will be discussed in greater detail below.

Figure 3:
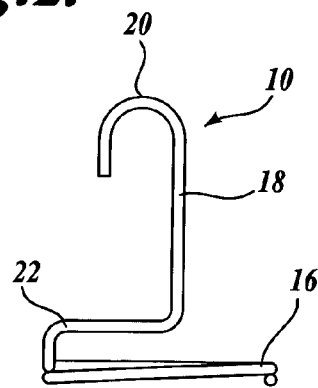
FIG. 3 is a side view of the apparatus shown in FIG. 2.
Figure 4:
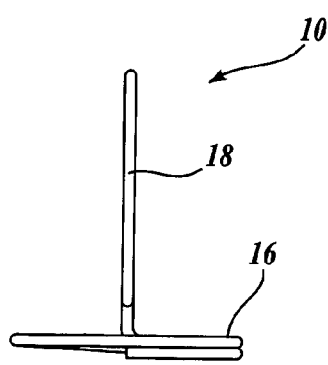
FIG. 4 is a rear view of the apparatus shown in FIG. 2.
Figure 5:
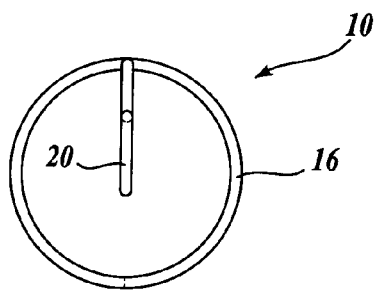
FIG. 5 is a top plan view of the apparatus shown in FIG. 2.

FIG. 3 provides a side view of the hanger apparatus 10 as shown in FIG. 2. FIGS. 4 and 5 provide a rear view and top plan view, respectively, of the hanger apparatus 10. Again, while the coil 16 is shown having 1 ½ loops, other embodiments of the invention may include greater or fewer loops in the coil.

Figure 6:
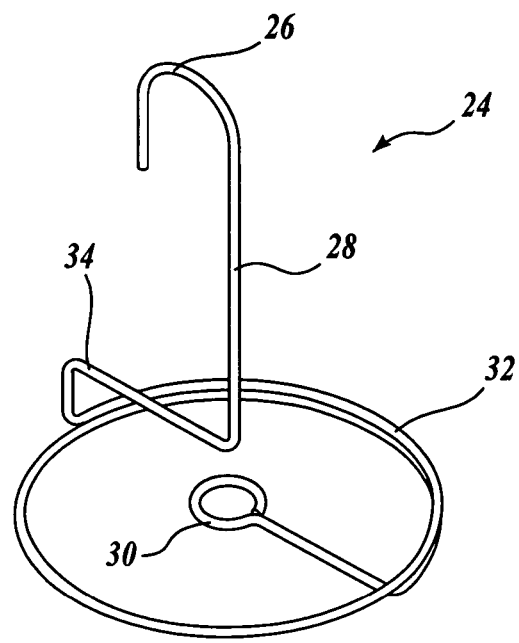
FIG. 6 is a perspective view of another embodiment of apparatus constructed in accordance with the present invention including a securing eyelet.

FIG. 6 illustrates another embodiment of apparatus 24 constructed in accordance with the present invention for securing a cap of a container to an external structure. The apparatus 24 in FIG. 6 is configured with a hook 26, body 28, and coil 32, that are formed similar to the hook 20, body 18, and coil 16 shown in FIG. 2. The apparatus 24 further includes retaining structure in the form of an eyelet 30 that, in this embodiment, is connected to the coil 32. The eyelet 30 is shown formed of a hook or loop of wire near the center of the coil 32 and connected to the coil 32 by way of a connecting wire. In other embodiments of the invention, the eyelet 30 may be located elsewhere in relation to the coil 32. Preferably, the eyelet 30 is sized to receive a fastener that is secured within the interior of a cap and thereby engage the apparatus 24 within the interior of the cap when the apparatus is installed. For example, a gas cap may be configured with a screw that is inserted through the eyelet 30 and secured within the interior of the cap. The eyelet 30 may thus act as a retaining structure alone or in combination with an outward force from a coil, such as the coil 32. A positive attachment to the interior of a cap provided by a fastener and eyelet as described above further ensures the apparatus 24 will remain within a cap when the apparatus is installed.

Figure 7:
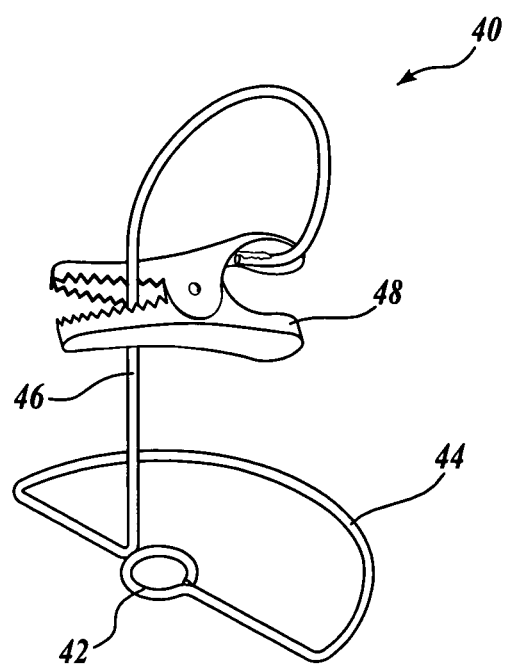
FIG. 7 is a perspective view of yet another embodiment of apparatus constructed in accordance with the present invention.

FIG. 7 illustrates yet another embodiment of an apparatus 40 constructed in accordance with the present invention. The apparatus 40 includes an eyelet 42 connected to a semicircular coil 44 comprised of a partial loop. A body 46 is connected at one end to the coil 44 and at the other end to securing structure 48, in this instance in the form of a closure mechanism, such as a clip. The body 46 is preferably flexible near the clip 48 so that when the apparatus 40 is installed in a cap and the cap is removed from a container, the clip end of the body 46 may be looped around an external structure, such as a cable 14 as shown in FIG. 1, and connect to itself as shown in FIG. 7. The clip 48 may be any type of clip, such as an alligator clip as shown, or other type of clip. In another embodiment, the clip 48 may be replaced with a hook structure. The clip 48 may also be configured to connect directly to an external structure, such as the cable 14 shown in FIG. 1, instead of looping around the external structure and clipping to the body 46.

The apparatus 40 is shown in FIG. 7 without an intermediate bend as illustrated at reference numerals 22 (FIG. 2) and 34 (FIG. 6). However, it should be understood that an intermediate bend forming a space that accommodates a feature of the cap may further be included in the apparatus 40 shown in FIG. 7.

While various preferred embodiments of the invention have been illustrated and described, it will be appreciated that various changes can be made therein without departing from the spirit and scope of the invention. The scope of the invention, therefore, should be determined from the following claims and equivalents thereto.

The embodiments of the invention in which an exclusive property or privilege is claimed are defined as follows:

1. Apparatus for securing a cap of a container to an external structure when the cap is removed from the container, the apparatus comprising:
   (a) retaining structure including an eyelet sized to receive a fastener that can be secured within the interior of the cap, the retaining structure further including a coil configured to engage the interior of the cap when the apparatus is installed in the cap, wherein outward spring tension from the coil presses the coil against the interior of the cap and retains the coil in the cap; and
   (b) securing structure connected to the retaining structure that releasably secures the cap to an external structure when the retaining structure is installed inside the cap and the cap is removed from the container.

2. The apparatus of claim 1, in which the securing structure is a clip.

3. The apparatus of claim 1, in which the securing structure is a hook.

4. The apparatus of claim 1, in which the securing structure is a loop with a closure mechanism.

5. The apparatus of claim 1, in which the retaining structure is further shaped with an intermediate bend forming a space that accommodates a feature of the cap.

6. The apparatus of claim 5, in which the intermediate bend forms a space that accommodates a vent in the cap.

7. In combination, a cap and hanger apparatus comprising:
   (a) a cap configured to removably cover an opening in a container; and
   (b) a hanger configured with
      (1) a coil sized to fit within the cap, wherein the coil is configured to exert an outward spring tension against the interior of the cap when the coil is installed inside the cap;
      (2) a body connected to the coil, in which the body is configured to extend away from the coil and the cap when the coil is installed inside the cap; and
      (3) a hook connected to the body, in which the hook is configured to engage an external structure for hanging the cap from the external structure when the coil is installed inside the cap and the cap is removed from the container.

8. The hanger of claim 7, in which the coil, body, and hook are constructed of wire.

9. The hanger of claim 8, in which the wire used to construct the coil, body, and hook is a single integral length of wire.

10. The hanger of claim 8, in which the wire is made of stainless steel.

11. The hanger of claim 7, in which the coil is comprised of one or more loops.

12. The hanger of claim 7, in which the coil is comprised of a partial loop.

13. The hanger of claim 7, in which the coil is configured to be retained within the cap by spring tension against the cap.

14. The hanger of claim 7, in which the body is further configured with an intermediate bend providing a space that accommodates a feature of the cap.

15. The hanger of claim 14, in which the intermediate bend provides a space that accommodates a vent in the cap.

16. The hanger of claim 7, in which the hanger is further configured to remain in the cap when the cap is attached to the container.

* * * * *